April 5, 1966  G. N. HEIN  3,244,363
CENTRIFUGE APPARATUS AND BAG THEREFOR
Filed March 27, 1963  8 Sheets-Sheet 1

INVENTOR.
GEORGE N. HEIN
BY
Kane, Dalsimer and Kane
ATTORNEYS

April 5, 1966  G. N. HEIN  3,244,363
CENTRIFUGE APPARATUS AND BAG THEREFOR
Filed March 27, 1963  8 Sheets-Sheet 2

INVENTOR.
GEORGE N. HEIN
BY
Kane, Dalsimer and Kane
ATTORNEYS

April 5, 1966  G. N. HEIN  3,244,363
CENTRIFUGE APPARATUS AND BAG THEREFOR
Filed March 27, 1963  8 Sheets-Sheet 3
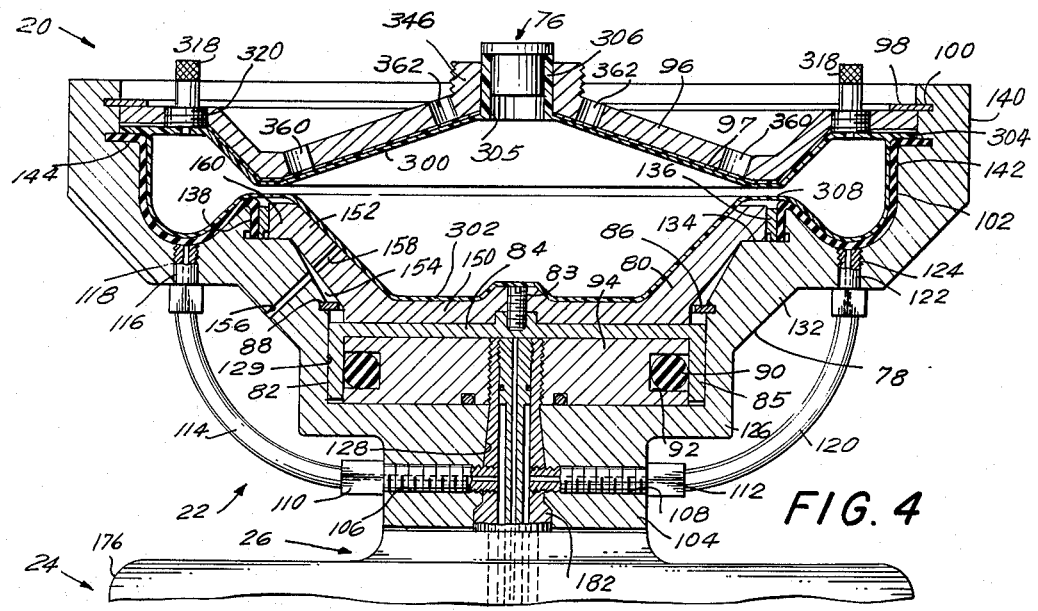
FIG. 4
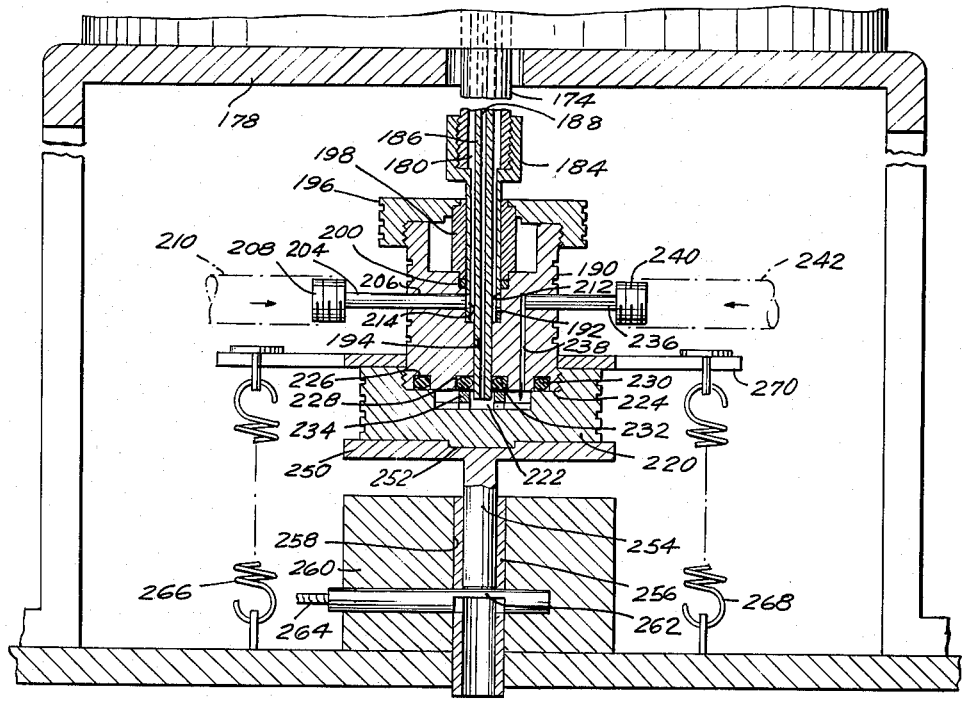
INVENTOR.
GEORGE N. HEIN
BY
Kane, Dalsimer and Kane
ATTORNEYS INVENTOR.
GEORGE N. HEIN
BY
Kane, Dalsimer and Kane
ATTORNEYS April 5, 1966  G. N. HEIN  3,244,363
CENTRIFUGE APPARATUS AND BAG THEREFOR
Filed March 27, 1963  8 Sheets-Sheet 5

INVENTOR.
GEORGE N. HEIN
BY
Kane, Dalsimer and Kane
ATTORNEYS

April 5, 1966 G. N. HEIN 3,244,363
CENTRIFUGE APPARATUS AND BAG THEREFOR
Filed March 27, 1963 8 Sheets-Sheet 6

INVENTOR.
GEORGE N. HEIN
BY
*Kane, Dalsimer and Kane*
ATTORNEYS

April 5, 1966  G. N. HEIN  3,244,363
CENTRIFUGE APPARATUS AND BAG THEREFOR
Filed March 27, 1963  8 Sheets-Sheet 7

INVENTOR.
GEORGE N. HEIN
BY
Kane, Dalsimer and Kane
ATTORNEYS

April 5, 1966 G. N. HEIN 3,244,363
CENTRIFUGE APPARATUS AND BAG THEREFOR
Filed March 27, 1963 8 Sheets-Sheet 8

INVENTOR.
GEORGE N. HEIN
BY
Kane, Dalsimer and Kane
ATTORNEYS

United States Patent Office 3,244,363
Patented Apr. 5, 1966

3,244,363
CENTRIFUGE APPARATUS AND BAG THEREFOR
George N. Hein, 331 Chesham Ave., San Carlos, Calif.
Filed Mar. 27, 1963, Ser. No. 268,396
6 Claims. (Cl. 233—28)

This application is a continuation-in-part of my application Ser. No. 822,561, filed June 24, 1959, now Patent No. 3,096,283, granted July 2, 1963.

The present invention relates to a structurally and functionally improved apparatus as well as method for centrifuging liquid materials to separate them into their various constituents and an improved receptacle for use therewith. The invention has particular application to the centrifugation and fractionation of whole blood; and, as an illustrated embodiment, this disclosure will be devoted primarily to this application. It should be understood, however, that this invention has and contemplates wider applications and the separation of other materials.

Heretofore, a number of procedures have been proposed and practiced for obtaining plasma from blood. These, however, would unfortunately require rather large expense and time, not to mention results of doubtful accuracy and ingredient recovery far from an optimum standard. A conventional technique, for example, is batch separation by centrifugation wherein selected individual receptacles, either in the form of bottles or bags containing whole blood, where suitably mounted in a centrifuge. Such apparatus, however, required a number of strategically located receptacles for purposes of balancing the centrifuge head before the centrifuging operation was initiated. Alternately, counter weights would be employed particularly when a single or relatively small number of receptacles containing blood were to be centrifuged. Otherwise, the revolving head, when in an unbalanced state, would not only be subjected to undesirable stresses and torques but would also induce them.

As a rule, the individual batches of blood due to the particular parameters and characteristics of the apparatus would be placed at an appreciable radial distance from the axis of rotation of the centrifuge head. Quite understandably, the inertial forces required to be overcome resulted in an appreciable lapse of time before the centrifuge head would reach its selected running speed of rotation particularly in view of the mass involved. Conversely, when separation of the blood constituents was attained, the deceleration times were also high requiring, in a number of cases, the incorporation of breaking devices. The spinning of blood containers results in a temperature rise of the blood as a result of air friction. Heating from air friction and long periods of centrifugation of blood require centrifugation under refrigerated conditions. The required time incident to the operation of the centrifuge alone would ordinarily be in the neighborhood of thirty minutes.

Nevertheless, cross-mixing of red cells with plasma occurred frequently thereby minimizing the accuracy of separation by such apparatus. Either siphoning or squeezing, for example, was utilized for purposes of removing plasma. The percentage of pure plasma capable of being recovered under the above procedures and techniques was very small as compared to the quantity of whole blood utilized. Under such conditions, remixing was quite common and, in most cases, inevitable upon cessation of operation of the centrifuge and attendant diminution of centrifugal forces.

As will be appreciated, plasma may be introduced and given to a person without concern over blood types either that of the donor or donee. In any blood bank for human consumption, blood is ordinarily considered outdated when about 21 days old. Therefore, it would be desirable to retrieve plasma by separating the particulate phase from the continuous before the inception of cell decay. A "unit of blood" at such installations, as well as in hospitals per se, is taken to be 440 cc. of blood and 110 cc. of the preservative ACD which, in essence, contains anticoagulants and stabilizers, ascorbic acid, sodium citrate and dextrose. Naturally, the amount of preservative will vary depending upon its formulation and may be selected from such other materials as heparin and EDTA. As will be observed with the ACD solution, a total volume of approximately 550 cc. per unit of blood should be contemplated. A normal male has a hematocrit of $47.0 \pm 7.0\%$ and a normal female $42.0 \pm 5.0\%$. A unit of plasma, under such circumstances, will be about 250 cc. in both instances.

With the foregoing in mind, the prior art techniques were only able to recover a relatively low percentage of plasma which, at best, would be in the neighborhood of 60% to 70%. Centrifugation times, as stated, were of undue magnitude. R.p.m.'s were necessarily low even with this recovery because during batch operations the red cells could readily be damaged with prolonged periods of centrifugation.

The present invention has for one of its primary objects the elimination of the disadvantages and drawbacks of prior art centrifugation apparatus as typified in the above and, at the same time, provides for an improved apparatus and attendant method for centrifuging at relatively high speeds and in the illustrative embodiment herein provides cell-free pure plasma in a minimum amount of time thereby eliminating the many variables due to prolonged processing of whole blood.

Another object of this invention is to provide for the separation of whole blood into ready-to-use plasma by an improved means and technique for centrifuging a single, individual blood sample without being concerned with balance of centrifuge head.

A further object is to provide for accurate centrifugation particularly of whole blood wherein an optimum amount of pure plasma is attained rapidly without danger of detrimental or uncontrolled cross-mixing of the constituents by introducing an effective seal, after separation, between plasma and red cells whose separation is adjustable radially with respect to the axis of rotation, the seal capable of being located along another zone of stratified particulate phase, when dictated.

A still further object is to provide an improved and efficient process for the centrifugation of whole blood by employing the foregoing apparatus and, at the same time, utilizing a disposable blood bag into which a blood unit may be readily introduced, separated into its constituent parts and then trapped to provide pure plasma.

Still another object is to provide an improved centrifugation apparatus and method which utilizes an improved disposable blood bag wherein whole blood may be separated to provide buffy-coat-free plasma, buffy-coat-free red cells or plasma rich in buffy-coat which may be taken to include those constituents of blood other than plasma and red cells such as white cells, leukocytes, platelets, etc.

Other objects and advantages of the present invention are realized and contemplated by the disclosed centrifuge having a minimum number of parts each individually simple and readily assembled to provide for effective high speed centrifugation permitting the recovery of high percentages of separated constituents of a liquid material. Thus a centrifuge incorporating the teachings of the present invention includes a centrifuge head which, in its ready-to-use condition, is capable of receiving a disposable bag and secures it in place during centrifugation. In this connection, a removable cap facilitates the positioning, securement and removal of the bag with respect to the head. At the same time, the cap as well as the bag are provided with aligned openings to permit the insertion of the selected quantity of liquid material to be separated. As explained in the foregoing, although the present invention has wide application to the centrifugation and separation of many liquid materials, the present application will be devoted primarily to the separation of whole blood into its constituents. It should be understood, however, that this particular application is presented for illustrative purposes only.

The configuration of the bag is such that a central chamber is provided for isolated pure plasma and an annular circumferentially extending peripheral well or precipitate chamber communicating therewith. The volumetric capacity of the well is sufficient to accommodate during centrifugation all of the red blood cells buffy-coat together with a very small percentage of plasma. In this connection, it may very well be desirable to isolate buffy-coat-free plasma for such persons that are sensitive to such foreign cells or, on the other hand, buffy-coat-rich plasma wherein it is desired to retain platelets in plasma for enhancing the recipient's clotting mechanism. Furthermore, it may be desired in connection with the latter to merely isolate buffy-coat-free cells.

It should be understood that whole blood includes white blood cells and platelets in addition to plasma and red blood cells. The white and red blood cells, together with the platelets, are heavier than plasma and are formed elements which are carried by the plasma. With this in mind, the instant disclosure will merely mention plasma and the red cells for simplicity. It should be realized, however, that in obtaining pure plasma by centrifugation all of the heavier particles are separated.

The centrifuge head is drivably coupled with the output shaft of a motor. Included in the head is a plunger on which the central chamber of the bag is adapted to rest. The well of the bag, on the other hand, is adapted to be accommodated by receptive surfaces of the head radially outwardly of the plunger. The plunger, through pneumatic pressures properly applied at the selected moment, will shift towards the cap during rotation of the head to provide a seal at the juncture between the central chamber and well of the bag following the separation of the liquid material into its constituents and fractions.

The effective capacity of the annular well is variable in order to assure that the desired fractionated constituents as well as the proportion of each, as the case may be, are disposed either in the well or the central chamber during centrifugation and immediately prior to sealing the juncture therebetween. A viewer is conveniently supported by the centrifuge to enable the operator or attendant to accurately adjust the capacity of the well during the rotation of the head.

Thus, after the bag is mounted in the centrifuge head and loaded with the selected blood sample, the motor is energized to initiate the rotation of the head. As the head rotates, the blood constituents of higher specific gravity move outwardly to replace, in the peripheral well of the bag, the constituents of lower specific gravity. Since a relatively high speed centrifuge is contemplated, the desired separation is attained within a minimum period of time. At such time, the separation is viewed and the capacity of the peripheral well varied in accordance with the desired fractionation and separation of the constituents of the blood. When, for example, pure plasma is the only constituent desired in the central chamber and the red cells as well as buffy-coat are disposed entirely in the annular well, the operator will actuate the pneumatic system to cause the plunger of the head to shift upwardly to seal the juncture between the well and the central chamber. The rotation of the head is thereafter stopped and during deceleration the sealed relationship subsists. The lighter constituent plasma will be trapped in the central chamber with the constituents of higher specific gravity contained in the peripheral well. The pure plasma or buffy-coat-rich plasma, depending upon the type of plasma the operator desires, may now be removed from the bag through coaxial openings in both the bag and cap through either the employment of an open or closed system, as will be more fully explored in the following:

In order to reload the centrifuge, the cap need only be removed and the bag replaced. The cap is remounted to clasp the new bag securely in place in the centrifuge head after which the centrifuging operation on a fresh blood sample may be repeated.

Other objects and advantages will become apparent from the following detailed description which is to be taken in conjunction with the accompanying drawings illustrating somewhat preferred but in no sense limiting embodiments of the present invention, and in which:

FIGURE 4 is an enlarged sectional view through the centrifuge head and associated structure showing the boot deflated and sealing piston lowered and with the air separator block raised;

Figure 1:
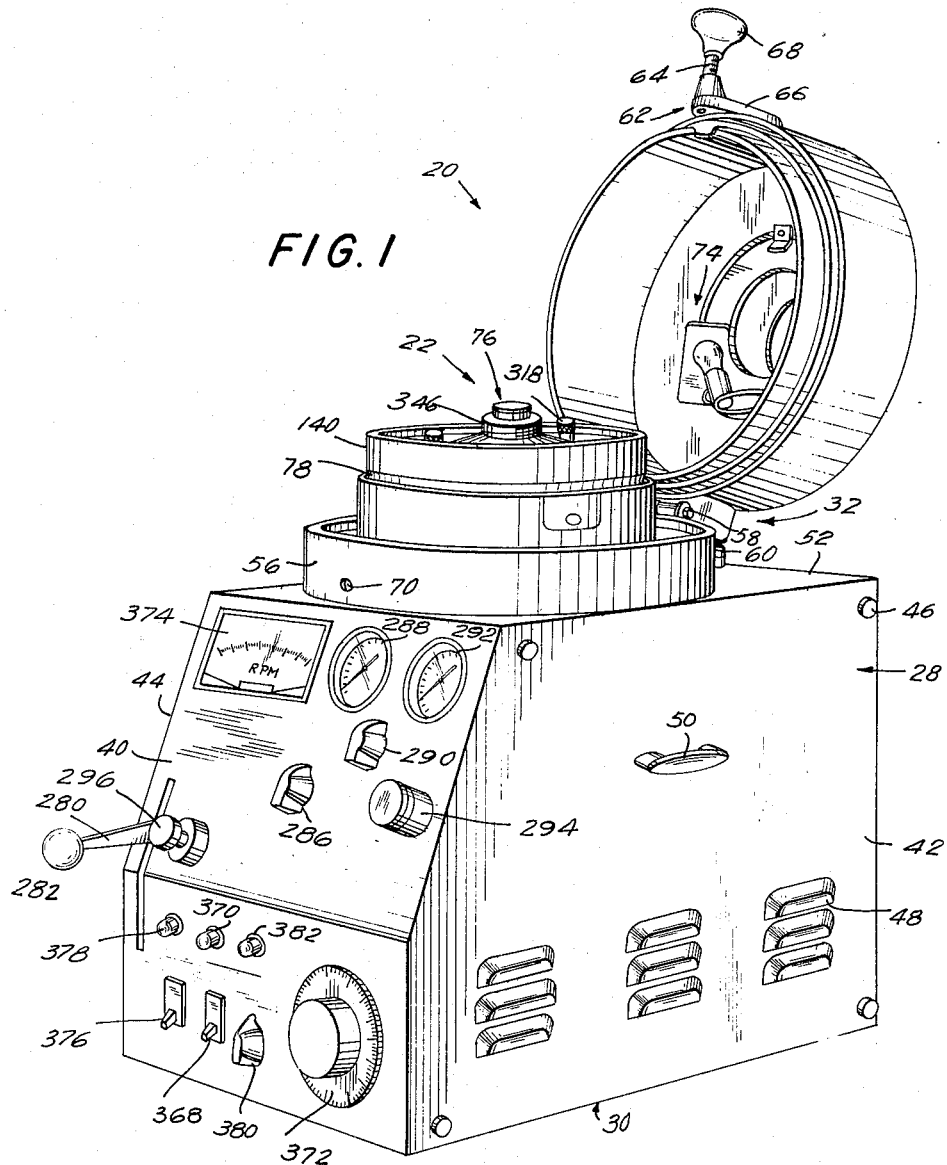
FIGURE 1 is a perspective view of a centrifuge embodying the teachings of the present invention with the head of the centrifuge casing pivoted to an open position.

The illustrated centrifuge 20 includes a head assembly 22 coupled with motor assembly 24. These parts are conveniently incorporated in a casing 28 including a base 30 and a hinged cover 32 thereon for shielding the head assembly and providing convenient access thereto.

Casing

With respect to the base 30, it will be observed that a frame 34 is included and may be comprised of a number of angle irons welded to one another at the necessary joints. A base plate 36 is mounted by the frame 34 as is the case with the rear panel 38. The front of the base 30 is provided with the control panel 40 having the configuration shown of a substantially vertical lower section and inclined upper section to facilitate reading and manipulating various dials and indicators mounted on this panel. The base is also provided with a pair of detachable side panels 42 and 44 coupled to the frame by means of a suitable number of screws 46. One of the side panels may include a network of vents 48 to ventilate the interior of the base 30 and maintain the revolving parts at a suitable operating temperature. A handle 50 may extend from each panel to facilitate handling when mounting and removing them from the frame 34. A top plate 52 is also mounted by the frame and includes an upwardly extending annular flange 54 defining a central opening through which the head 22 extends. Depending from the top plate 52 is a second concentric flange 56 which conveniently mates with the hinged top closure 32.

In this connection, a hinge assembly 58 extends between the upper plate 52 and the closure 32 as shown. A rest 60 extends vertically from the top plate 52 and serves to support the closure in an open position. A locking mechanism is disposed diametrically opposite the hinge 58 and serves to lock the closure in a position around the head assembly 22. As will be explained, such assembly will not be operable until such time as the closure is in this locked position. The locking mechanism 62 is essentially a threaded stud 64 meshed with the tapped opening in plate 66; and through the manual turning of the handle 68, the stud is adapted to be inserted in and removed from the bore 70 in the annular flange 56. When, in a fully inserted position in the bore 70, the stud 64 advantageously closes the contacts of a switch 72 which otherwise would maintain the circuit to the motor assembly 24 open and, consequently, serves as a safety factor, an indicator light 73 may be employed to illuminate when switch 72 is closed. Similarly, lamp assembly 74 is mounted on the closure and likewise energized to facilitate visual observation of the interior of the closure 32 and particularly head assembly 22.

Head assembly

The head assembly 22 is formed with a compartment that serves to secure a disposable bag 76 in which the material to be separated is initially introduced, centrifuged, then separated and its separated constituents eventually trapped. Thus, the head assembly 22 comprises a centrifuge body 78 supporting a plunger 80 which resembles somewhat an inverted truncated cone. The plunger 80 is connected directly to a cylindrically shaped piston 82 by means of central screw 83. The piston, therefore, includes a base 84 and sidewalls 85. As will be explained, the plunger 80 is displaceable upwardly by the action of air pressure against the internal face of the base 84 of the piston 82. In this connection, pressure between the body 78 and the piston 82 is maintained by means of strategically located seals. An annular retaining ring 86 fitted into a suitably formed recess 88 in the body 78 limits the permissible vertical displacement of the piston 82 and, consequently, the plunger 80. Thus, among others, an O-ring 90 engages surfaces of the interior of side walls 85 of the piston 82 and is accommodated in an annular recess 92 in a circularly shaped disk 94 coupled for rotation with the upward shaft of the motor assembly 24. As will be explained, this disk serves as a nut for securing the head and motor assemblies to one another.

A cap 96 is additionally included as part of this assembly and is removably secured to the body 78 by means of a snap-ring 98 adapted to be fitted over the periphery of the cap 96 and disposed in the annular accommodating recess 100. Under such circumstances, the disposable bag 76 is adapted to be anchored within the head assembly 22 during centrifugation. On the other hand, the cap 76 is readily removed from the body 78 when the separated constituents of the liquid to be centrifuged have been utilized and applied, as intended, and for permitting the reloading of further bags for the selected liquids to be separated.

The pneumatic system capable of shifting the plunger 80 by acting against the faces of the piston 82 is also conveniently utilized to act against surfaces of an annularly shaped boot 102 supported by the body 78. The boot 102, under these circumstances, is adapted to inflate and in so doing to reduce the effective volume and, consequently, the capacity of the periphery of the bag 76 in a manner to be described in detail shortly.

Reference is now made to structural details of the body 78 which accordingly includes a base portion 104 formed with a pair of diametrically opposed tapped openings 106 and 108. These openings receive correspondingly threaded nipples 110 and 112 respectively. Each of these nipples 110 and 112 form part of a pneumatic coupling from an air pressure source to be described in detail to the interior face of the boot 102. Thus, nipple 110 is coupled with an air line or hose 114 which, in turn, is coupled with another nipple 116 threadedly received by the tapped opening 118 communicating with the interstice between the boot and the body. The other nipple 112 similarly coupled with the air line 120 linked with the threaded nipple 122 mounted in the tapped opening 124.

The base portion 104 extends into a somewhat enlarged cylindrical portion 126 both of which have extending coaxially therethrough the central bore 128 having tapered portions for accommodating corresponding parts of the motor drive. The cylindrical portion 126 defines a generally circular cavity 129 which neatly receives the piston 82 freely movable therein. A generally conical portion 132 extends from the cylindrical portion 126 and receives plunger 80 therein. In this connection, the conical portion 132 is formed with a generally flat interior face 134 on which the outer periphery of the plunger 80 rests. Embracing the peripheral edge of the plunger is a retaining ring 136 which additionally serves to secure the inner circumferentially extending edge of the boot 102. This ring 136 under these circumstances cooperates with the vertical cylindrical wall 138 of the body extending upwardly from the flat face 134.

The body 78 is then cupped outwardly to form a generally cupped portion 140 defining an internal circumferentially extending annulus 142 with which the deflated boot 102 conforms and therefore the associated surfaces of the bag 76. The annulus terminates in a shoulder 144 on which the associated edge of the boot 102 rests as well as the periphery of the bag 76, the latter being clamped in place through the securement of the cap 96 by means of the ring 98.

As stated, plunger 80 is adapted to be displaceable with respect to body 78 in order to permit trapping of separated constituents of the contents of the bag 76 during the centrifuge operation. Under such circumstances, plunger 80 of substantially inverted conical shape, includes base 150 from which extends conical wall 152. The interior face of the base 150 and wall 152 are adapted to conform with the contour of the central portion of the lower walls of the bag 76 as shown. The inclination of the exterior face of the conical portion 152 is such that, together with the interior face of the conical portion 132 of the body 78, a circumferentially extending cavity 154 is formed. This cavity pneumatically couples the opening 156 and air passages 158 in the conical portion 132 and conical wall 152 respectively. When air under pressure is introduced through opening 156, the central chamber of the bag 76 will be reduced in volume. A radially extending annular flange 160 extends from the conical wall portion 152 and is adapted to rest on the surface 134 of the body 78.

Motor drive

The head assembly 22, as explained, is drivably coupled with the output of the motor assembly 24. In this connection, a motor output shaft 174 extends from both the upper and lower ends of the motor casing 176 anchored to motor mount 178. This shaft also forms part of the pneumatic system of the centrifuge by conveniently providing a longitudinally extending passageway 180. The upper end of the shaft 174 is externally threaded and receives the mating threads of head retaining nut 94. This nut firmly holds the head assembly 22 in place and couples it with the output shaft 174 of the motor 24. As explained, the base portion 104 of the body 78 is provided with a generally tapered bore 128. The surfaces defining this bore 128 are adapted to seat complementary formed surfaces of the shaft 174. Under such circumstances, the tighter the nut 94 is turned, the more firm the body 78 is wedged into seating engagement with the shaft enlargement 182.

A motor assembly satisfactorily adapted for certain applications of this invention is available commercially and is rated at 1 H.P. and is capable of turning at speeds in excess of 10,000 r.p.m.

The bottom end of the shaft 174 is similarly threaded and supports a tubular extension 184. A hollow reed 186 is aligned by means of this extension 184 and is threadedly secured to the distal end of the drive shaft 174. This reed 186 defines with the bore 180 of the output shaft 174 a cylindrical air passage which communicates with the bores in the threaded nipples 106 and 108. The bore or central passage 188 of the reed 186, on the other hand, communicates with the inner face of the base of the piston 82. The pneumatic system for supplying air at the desired moment to these various passageways will now be explained.

Pneumatic system

The remainder of the pneumatic system is coupled with the lower terminal end of the reed 186 as well as the associated extension 184 to provide the necessary air pressures and, at the same time, permit rotation of these parts. An air separation block 190 is accordingly provided with a central bore 192 extending into a reduced bore 194 both of which respectively receive the lower ends of the tubular extension 184 and reed 186. An upper cap 196 is threadedly mounted on the upper end of the block 190 and serves to secure the stabilizing bushing 198. This bushing is concentrically mounted on the exterior of the extension 184 and provides a journal therefor. In order to provide an effective air seal for the juncture between the exterior of the extension 184 and the surfaces of the block 190, an annular seal 200 is placed therebetween and mounted in place by means of the bushing 198.

In order to introduce air under pressure into the bore 180 between the inner face of the drive shaft 174 and exterior of the reed 186, a tube 204 communicates therewith. Thus, the tube is fixed in a bore 206 of the block 190. The outer end of the tube is provided with a threaded coupling 208 for receiving an air hose 210 adapted to contain air under pressure. The inner end of the tube 204 is disposed opposite an annular recess 212 formed in the exterior of the extension 184. This recess communicates with the bore 180 by means of radially extending openings 214.

The bottom end of the block 190 is externally threaded for purposes of receiving the lower cap 220 having an internal circular recess 222 as well as the elevated circumferentially extending shoulder 224. The base of the block 190 is provided with a pair of concentrically disposed recesses 226 and 228 which conveniently receive O-rings 230 and 232 respectively, the latter serving as a rotor seal. An annular ring 234 is supported above the bottom face of the recess 222; and when forced against the aligned seal 232, it compresses washer 232 to provide a more effective seal for the rotor and, consequently, the associated air passages.

Another tube 236 extends from the block 190 such that its internal bore communicates with the vertical passageway 238 in the block opening into the sealed recess 222 defined in the lower cap 220. The outer end of the tube 236 supports a threaded coupling 240 which conveniently receives the air hose 242 also coupled with a source of air pressure. Under these circumstances, when it is desired to shift the plunger 80 upwardly to seal the precipitate chamber of the bag 76 from the central chamber, air under pressure will be introduced through the hose 242 through the tube 236 into passageway 238, the recess 222 and then through the central bore 188 of the reed 186 to the bottom face of the base of the piston 82.

An elevating platform 250 supports a lower cap 220; and through the interconnecting tongue and groove 252 transverse movement of these parts is prevented. This platform 250 includes a downwardly extending stud 254 slidable in the tubular bearing 256 fixed in the bore 258 of the block 260. The lower end of the stud 254 rests on the cam 262 which is supported for rotation by the block 260 as well as surfaces of the bearing 256 as shown. The configuration of the cam 262 with the bottom end of the stud 254 acting as a follower, together cause the platform 250 and, consequently, the lower block 220 to shift vertically. When the cam 262 is turned so that the stud rests on the depressed portions of the cam face, the elevator 250 and, consequently, the head 220 will descend and thereby slide O-rings 200 and 232 away from the sealing contact with tubular extension 184 and reed 186. Accordingly, unnecessary wear of the seal is eliminated, permitting longer seal life. The exterior end of the cam 262 is coupled with a flexible drive shaft 264 which, as will be explained, is adapted to be turned to rotate the cam 262 upon command. In this connection, a pair of return springs 266 and 268 extend between the base of the frame and the plate 270, as shown, to urge the lower cap 220 and, consequently, the block 190 downwardly into firm seating engagement with the platform 250.

Figure 2:
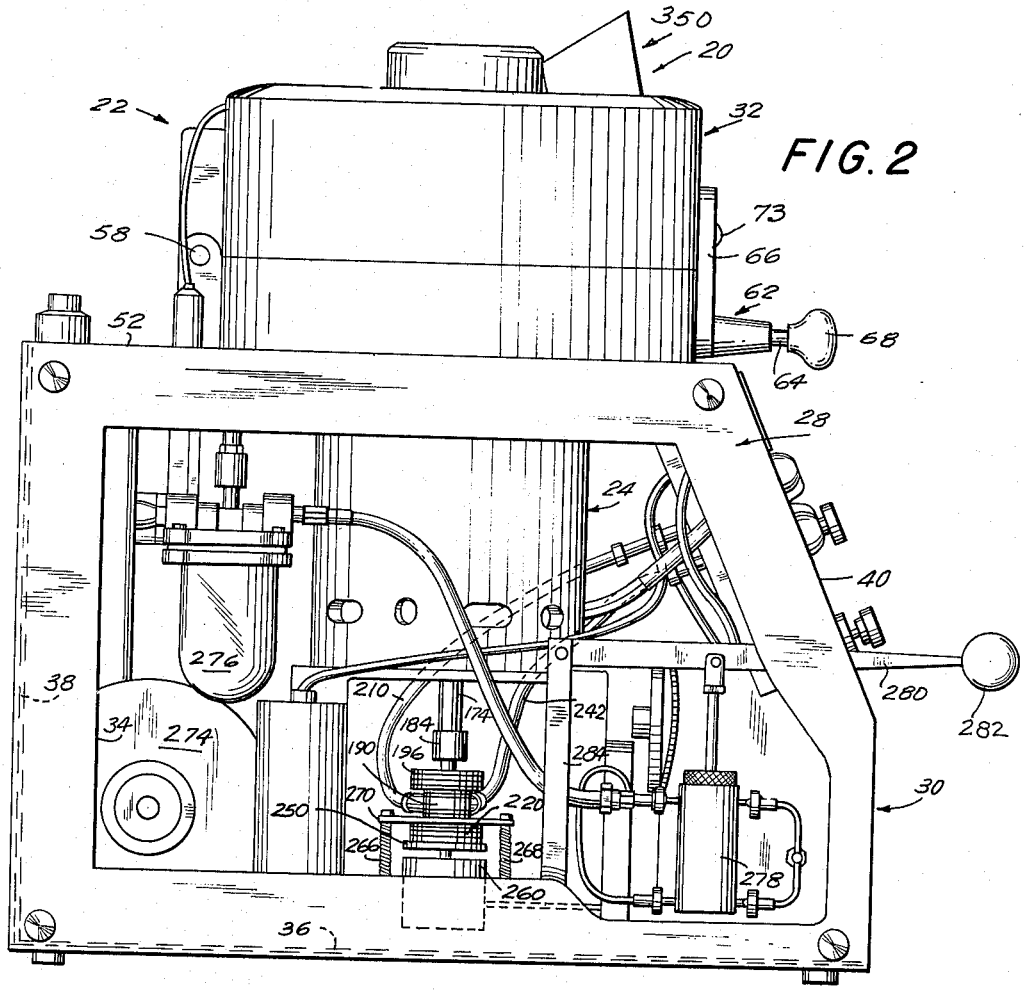
FIGURE 2 is a side elevational view with the casing side plates removed to expose the lower interior of the centrifuge.
Figure 3:
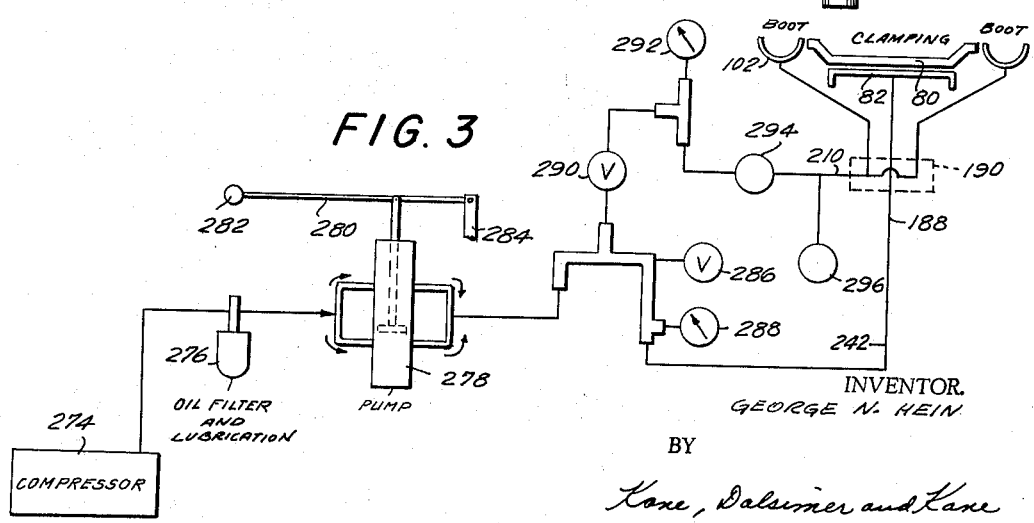
FIGURE 3 is a diagrammatic view of the pneumatic circuit employed.
Figure 5:
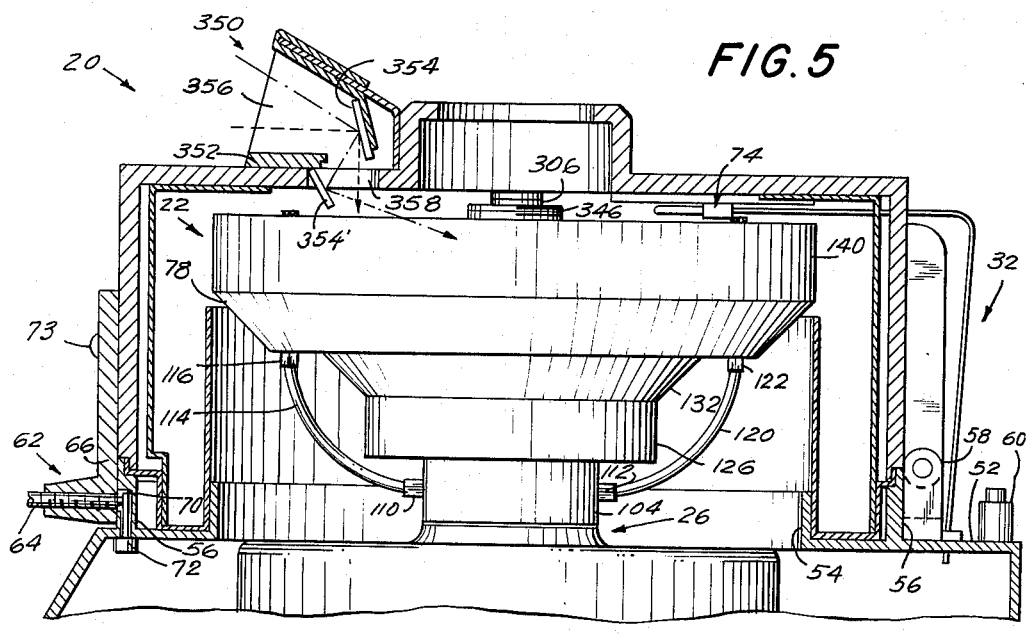
FIGURE 5 is an enlarged fragmentary sectional view with the head cover pivoted to its closed, lock position over the centrifuge head.
Figure 6:
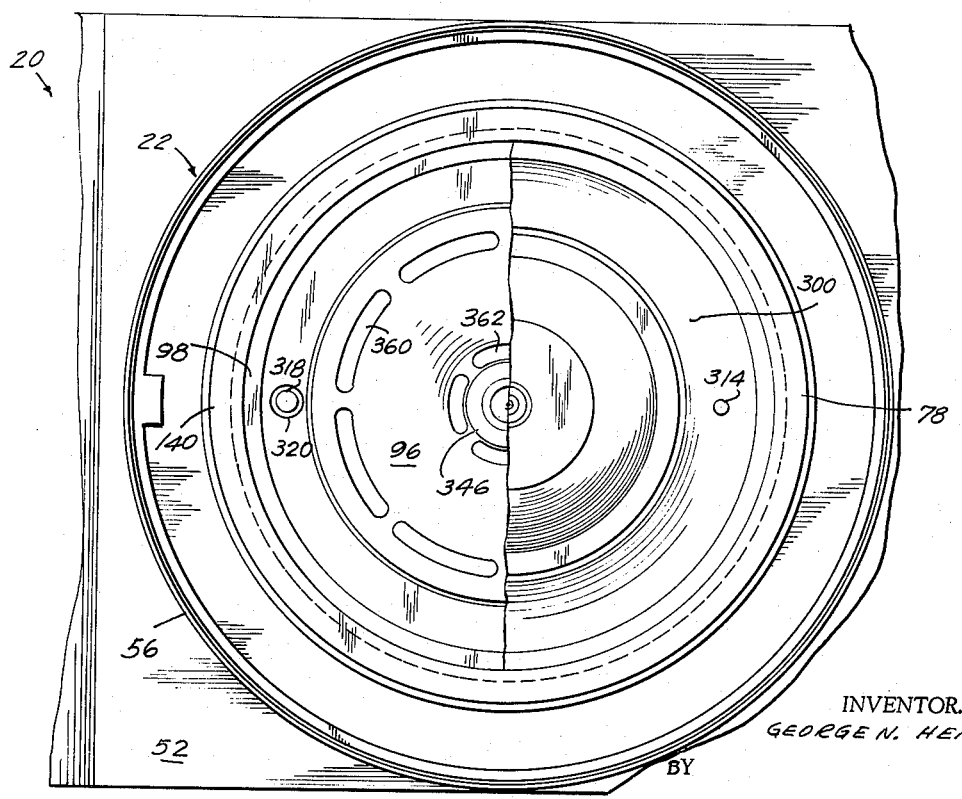
FIGURE 6 is a top plan view of the centrifuge head with certain parts broken away and removed revealing the bag receiving chambers and cavities.

The still remaining components of the pneumatic system may best be understood by reference to the schematic illustration of FIG. 3, the structural details of these components being shown in the FIG. 2. Thus, a compressor 274 is suitably anchored interiorly of the casing 28. Pressure from the compressor passes through the oil filter and lubricator 276 into the dual action, constant pressure, hand, air pump 278. A lever arm 280 having a handle 282 controls the operation of the pump and extends from the control panel 40. The arm 280 forms a pivotal connection with an upstanding arm 284 at its other end. The piston rod of the pump 278 is hingedly connected with the lever 280 intermediately its ends, as shown. The output leading from the pump 278 is transmitted to the interior face of the piston 82 through the valve 286. When opened, this valve will admit air pressure to the clamping piston 82 through the air line 242, tube 236, passageway 238, recess 222, and then into the reed bore 188. An air pressure gauge 288 may be placed in the line to register the air pressure acting on the piston 82.

The outlet port of the pump 278 is also coupled with the boot 102; and, under these circumstances, the valve 290 serves to admit air pressure to the boot. The pressure gauge 292 indicates the air pressure in this line. A manually actuated safety relief valve 294 is interposed in the air line between valve 290 and the boot 102. In this connection, when the valve 290 is opened, the relief valve 294 is manually depressed to permit air to inflate the boot 102 the desired amount as registered by the gauge 292 or as observed through the optical system to be described. Valve 294 is ordinarily opened to vent pressurized air to the atmosphere; and when closed, it will permit the boot 102 to be inflated when the valve 290 is opened. Furthermore, this valve 294 will maintain the boot in an inflated condition when closed after the closure of the valve 290. A micro-adjustment pressure release valve 296 is also included in this line to permit bleeding or release of the air under pressure in the boot to shift the line of demarcation radially outwardly when necessary.

With the foregoing in mind and assuming that the centrifuge head 22 is revolving at the desired speed of rotation together with an enclosed bag 76 containing the material to be separated, the heavier constituents will shift radially outwardly to displace the material of lighter specific gravity desired to be isolated in the main central chamber. Accordingly, the line of demarcation between the heavier constituents and the lighter constituent to be isolated should be shifted radially inwardly so that this line is aligned with the opposed annular sealing zones of the bag 76. In this connection, the boot valve 290 is open and substantially simultaneously therewith the safety valve 294 is manually depressed thereby exposing the boot 102 to line pressure as provided by the compressor 274. In this connection, it will be assumed that the compressor is capable of supplying 60 p.s.i. of pneumatic pressure. It is contemplated that such line pressure particularly in connection with the separation of whole blood will be sufficient to cause the line of demarcation to shift slightly past the flexing zones of the bag, in a radially inwardly direction. Quite obviously, in the event that line pressure is not sufficient to shift the line inwardly the desired amount, the hand pump 278 can be employed to supplement this pressure. In the event the line of demarcation is shifted past the flexing zones as stated, the micro-adjusting valve 296 need only be pulsed to align the line of demarcation with the flexing zones of the bag 76 while viewed through the optical system. For example, 5 p.s.i.g. can be vented per pulse of this valve 296. The boot valve 290 is then closed. It should be understood, however, that the safety valve 294 remains manually depressed to maintain the boot 102 in the proper inflated condition.

Subsequent to the foregoing operation, the plunger 80 is then shifted vertically to seal the flexing zones of the bag 76 to thereby isolate the constituents of the liquid material contained therein. The valve 286, under these circumstances, is opened to expose the inner face of the base of the piston 82 to line pressure at 60 p.s.i. The parameters of this system are such that this line pressure will have to be supplemented to assure the desired sealing of the bag's central chamber from the annular well during centrifugation. In the particular embodiment being discussed, when whole blood is being separated, the pressure in the line leading to the piston 82 is ordinarily raised to approximately 90 p.s.i. Therefore, the manual pump 278 is set in operation to supplement the compressor 274. When the desired pressure is reached and the central chamber is isolated from the annular well, the valve 286 is closed. The motor 24 may now be deenergized to stop the rotation of the centrifugal head 22. It should be understood that the specific pressures descussed are merely illustrative and other values can be advantageously adopted as well. It should be further understood that, while air pressure has been described as a medium to operate the boot and plunger structures, liquid mediums such as water, glycerine and oil can be used to accomplish the same results.

*Bag*

The bag 76 is preferably formed of an organic plastic material which renders it economically feasible commercially to permit only one time use of the bag and its eventual disposal. A suitable material for such purposes will include polyvinyl chloride. The volumetric capacity of the bag is in the neighborhood of 600 cc. for purposes of accommodating, in the case of blood separation, 440 cc. of whole blood and 120 cc. of ACD. The bag 76 is comprised of an upper wall 300 and a lower wall 302 which are integrally connected at their respective peripheries along the zone 304. This peripheral zone 304 is adapted to be placed in the centrifuge head 22 and be clamped between the periphery of the boot 102 resting on shoulder 304 and the retaining cap 96 secured in the body 78 by means of the retaining ring 98. The upper wall 300 is adapted to conform in configuration with the internal surface of the cap 96 through the interposed shield 97. The upper wall 300 is provided with a central opening 305 defined by an outwardly extending neck 306 which can be supplied with a removable cap or plug for storage purposes and maintaining asceptic conditions. Quite obviously, the central opening 305 permits the introduction of the material to be separated and, at the same time, the eventual removal of the constituents of lesser specific gravity from the central chamber.

The lower wall 302 possesses a shape generally conforming to that of the top face of the plunger 80 and at its periphery defines a well conforming to the configuration defined by the boot 102. At least the lower wall 302 is provided with some degree of flexibility whereby it is adapted to flex upwardly into firm engagement with the opposed surfaces of the upper wall 300 along the sealing zones 308 which is at the juncture between the central chamber and the outer well. When the bag walls 300 and 302 are in this sealing relationship, the separated constituents of the contents of the bag incident to centrifugation are isolated and entrapped. As will be apparent, the constituents of the material to be separated of a higher specific gravity will eventually be disposed primarily in the outer well whereas the constituents of lower specific gravity will be contained in the main central chamber.

In order to facilitate drainage of the fractionated precipitate in the outer well, one or more transversely extending plugs 310 may be provided on the upper wall 300 of the bag 76. Each plug 310 may be formed with a bore 312 extending longitudinally throughout its entire length communicating with the annular well through suitably formed aligned openings in the upper wall 300. Either a cap 314 or a diaphram (see FIG. 7) of the resealable type, may extend across the opening 312 and serve as a seal. A supplemental plug 318 may be employed to completely close the opening 320 provided in the cap 96 for the bag plug 310. In this connection, forces created during centrifugation are of such magnitude that the bag may burst because of inadequate inherent structural strength. With this in mind, reinforcement in the nature of such plugs 318 best be employed to eliminate any danger of this unfortunate occurrence. Caps 314 may also provide desired reinforcement. In addition, in the event that the bag 76 does not include plugs 310 or similar drainage facilities, the plug 318 may take the form of a solid element rather than one having a bore therein.

Figure 7:
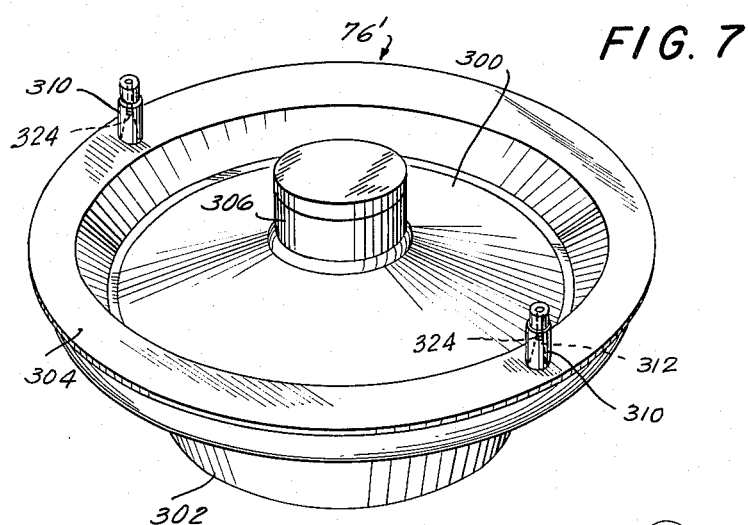
FIGURE 7 is a perspective view of a bag constructed in accordance with the present invention.

As shown in FIG. 7, a puncturable diaphragm 324 is employed which incidentally may assume resealable properties and characteristics. The bag 76' is, in most respects, identical with bag 76. Cap 314 may, however, be eliminated in this embodiment.

The bags 76 and 76' are representative of the open system for fractionating whole blood for immediate use. Under these circumstances, there is no need for maintaining strict asceptic conditions interiorly of the bag because of the contemplated one time use and disposal thereof.

Figure 8:
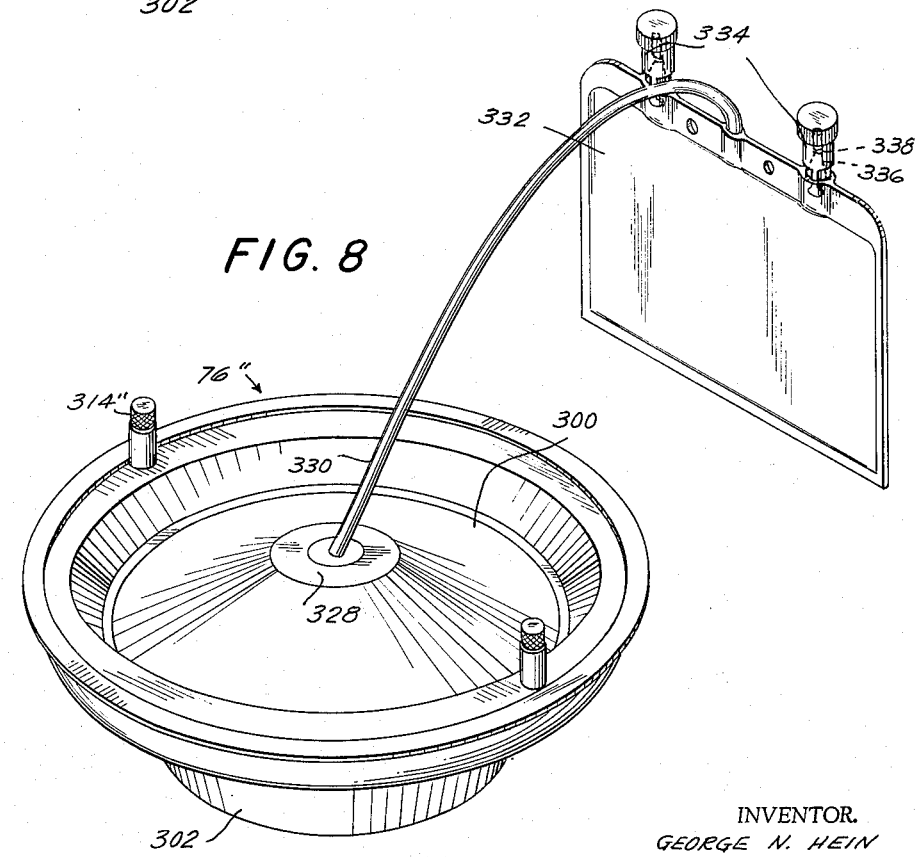
FIGURE 8 is another perspective view illustrating a modified form of bag having an accompanying "satellite" bag of reduced capacity for containing a quantity of an isolated lighter constituent of the contained liquid.
Figure 9:
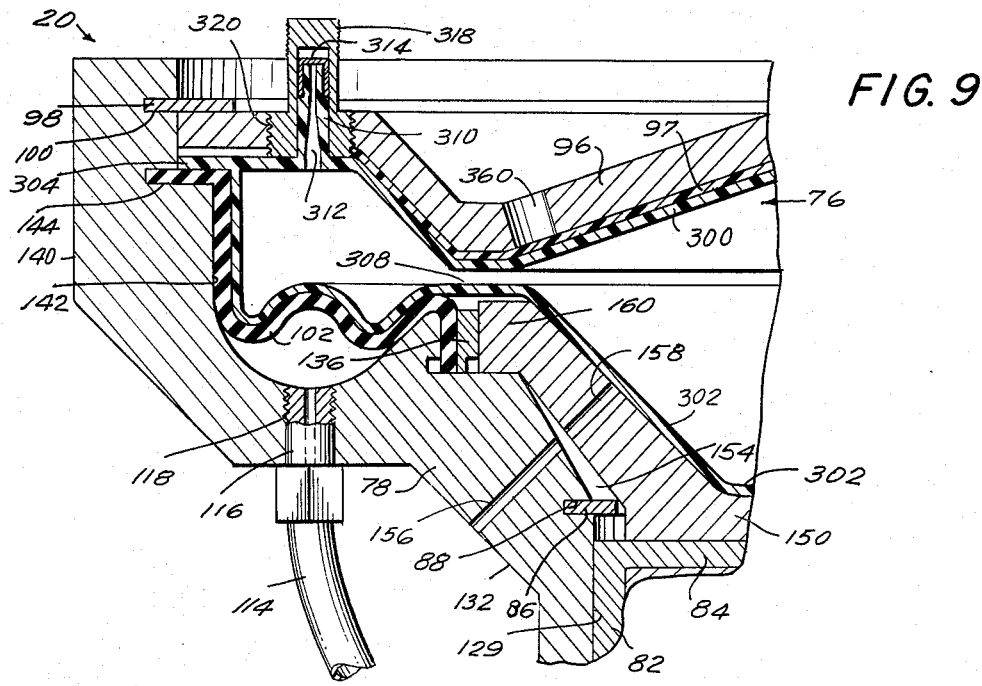
FIGURE 9 is an enlarged fragmentary section of the centrifuge head showing the boot inflated.
Figure 10:
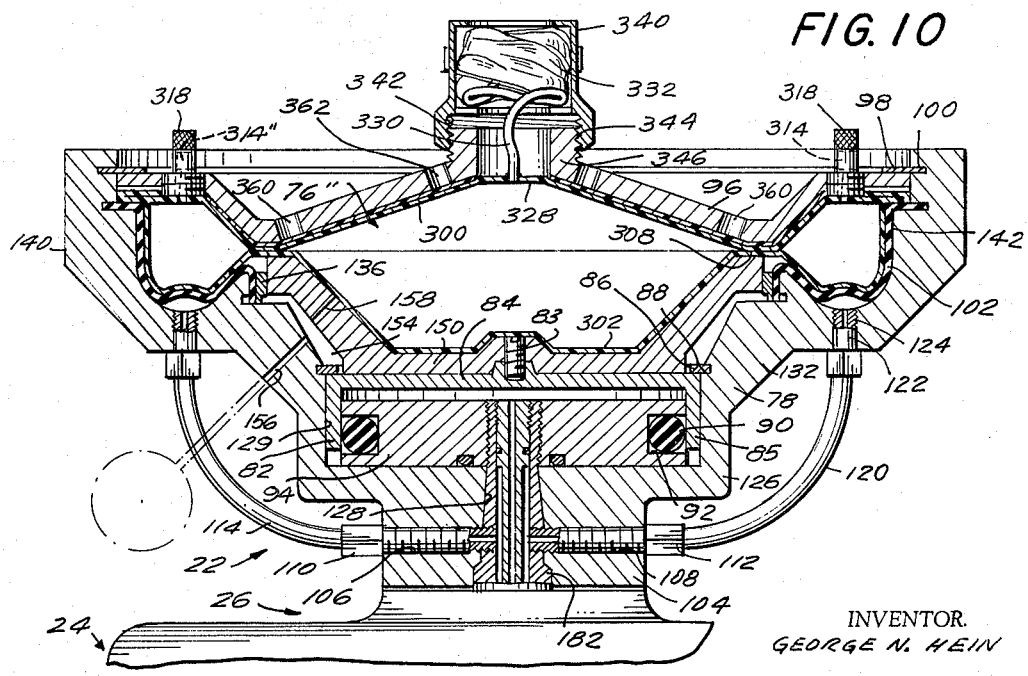
FIGURE 10 is similar to FIGURE 4 showing the piston raised to its sealing position with the bag of FIGURE 8 mounted in the head and containing the liquid to be separated by centrifugation.

In FIG. 8, a bag 76'' is further illustrated for use in collecting and storing blood prior to and subsequent to centrifugation. In this connection, the central plug is removed and replaced by an integral bored disk 328 which receives one end of a flexible tube 330, the other end of which communicates with the interior of a satellite receptacle or bag 332. This receptacle 332 may be formed with one or more plugs 334 having a central bore 336 sealed by a diaphragm or wall which may be of a resealable nature 338. Protective caps may be provided for the outer ends of the plugs 334.

In use, the blood specimen with anticoagulant may be introduced through the plugs 314''. Following separation, pure plasma or buffy-coat-rich plasma, as desired, is isolated in the main central chamber; and the receptacle 332 need only be deployed to readily collect this isolated constituent. Either the entire amount or merely a part thereof may be so segregated at one time or selected intervals. The liquid within the receptacle 332 need only be removed by the use of any one of a number of aspirating devices.

During centrifugation, the satellite bag 332 together with its tube may simply be folded and inserted in the retaining cap 340 having internal threads 342 adapted to mesh with the exterior thread 344 of the boss 346 of the cap 96.

The previously explained means for decreasing the volumetric capacity of the bag's central chamber is peculiarly adapted to the handling of the bag of this embodiment. Thus, by coupling the passageways 156 and 158 to a suitably regulated source of air pressure after the centrifugation and separation operation has ceased, the capacity of the central chamber can be decreased to therefore force the isolated plasma into satellite bag 332 through the tube 330.

Figure 11:
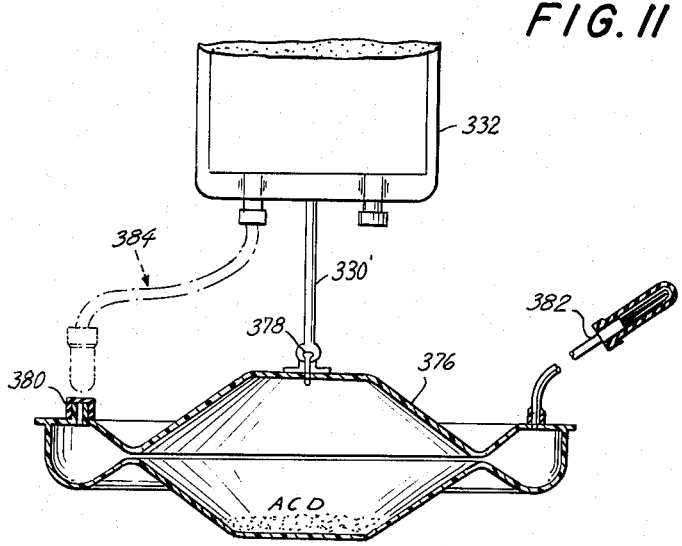
FIGURE 11 is a longitudinal sectional view of a closed system for performing a centrifugation operation on whole blood utilizing a disc blood bag and plasma satellite bag.

With the foregoing in mind, reference is now made to FIGURES 11 to 14 illustrating further versions of receptacle useable with the teachings of the present invention. In FIG. 11 a closed system is typified by this illustration. This system is somewhat similar to that illustrated in FIG. 8. The satellite bag 332 is substantially similar to that previously discussed and is connected with the bag 376 by means of the tube 330' which will include a displacement stopper 378 or ball serving as a stop valve between two bags. A pierceable rubber stopper 380 is provided on the annular well as well as a capped donor needle assembly 382 also hermetically sealed thereto. After the ACD solution is placed in the bag 376, the entire assembly is sterilized and is then ready for use. The transfer needle assembly 384 (shown in phantom) could, if desired, form part of this system. However, it is not incorporated if a truly closed system is to be employed. In this connection, no open air punctures other than a veni puncture should be made. The satellite bag 332 is removed by cutting the tube between two heat sealed (or tied off) areas following the centrifugation and the obtainment of the desired fractionation.

The particular system of FIG. 11 has a number of advantages. For example, this system will prepare plasma that is white blood cell free and red blood cell free. The counts of white blood cell and red blood cell in conventionally prepared plasma are quite high in comparison. Because of the control features a higher plasma yield per unit of blood is obtainable. Platelet rich plasma can be prepared more accurately. The entire buffy-coat can be included in the plasma with the presence of very few red blood cells or with a top strata of red blood cells, if desired.

In a further application of this embodiment, the satellite bag is removed after expelling white blood cell free plasma therein. The disc 376 is then respun. The buffy-coat is then expelled into the filtrate chamber and clamped off. The transfer needle assembly 384 may then be used to transfer the packed red blood cells into the satellite bag 332 previously removed. White blood cell free blood is now available and ready for immediate use or storage.

Figure 12:
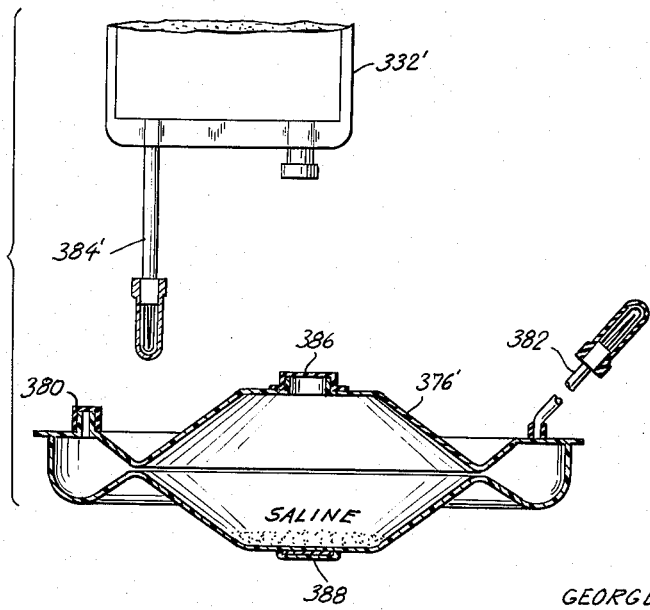
FIGURE 12 is a similar view illustrating the combination of a disc blood bag and plasma satellite bag having particular application to emergency uses.

The embodiment of satellite bag and disc of FIG. 12 has particular application for emergency use and would generally be furnished with a small amount of saline or in an empty condition. Special anticoagulants, donor blood or bank blood could be drawn or transferred into it. As the fractions obtained are for immediate use, multiple stopper punctures would not be objectionable. In this connection, the satellite bag 332' would have an integrally extending transfer needle assembly 384' which would be adapted to puncture the stopper 380 at the annulus of the disc 376' which, in addition, will include the donor or transfer needle assembly 382. A puncturable stopper 386 will be coaxially provided on the disc 376' as well as the similarly located disc 388 which serves to prevent the aspirating needle from puncturing the bottom of the disc.

Figure 13:
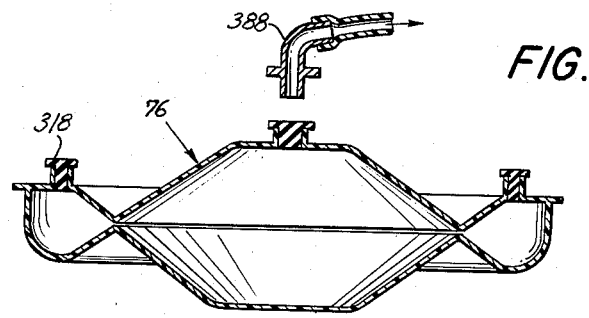
FIGURE 13 is still another similar view illustrating a disc blood bag which in operation would be in a non-sterile and reusable condition whereby relatively small batches of solutions containing constituents of close molecule weight can be separated and obtained without intermixing.
Figure 14:
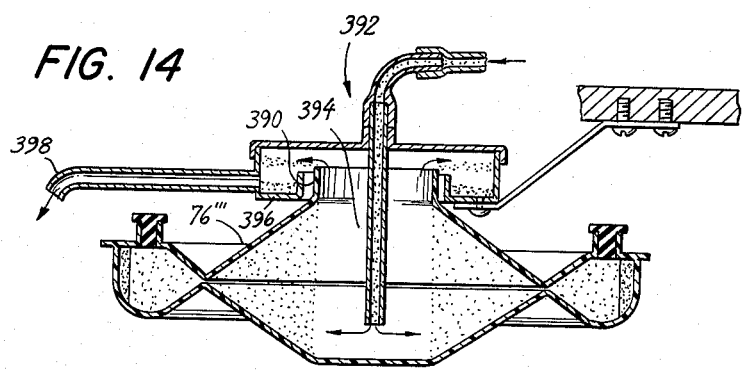
FIGURE 14 is a similar view illustrating another reusable disc bag associated with a collector which converts a centrifuge into an efficient continuous flow centrifugation process.

Referring now to FIG. 13, the bag 76 is diagrammatically shown with a fitting 388 adapted to be coupled with any of the bag openings for purposes of aspirating or effecting the expulsion of the desired bag ingredients.

The disc bag 76''' is provided with an enlarged neck 390 about which is adapted to be concentrically mounted a collector assembly 392 which advantageously converts the centrifuge into an efficient continuous flow centrifugation operation. Under such circumstances, the assembly 392 is fixed relative to the inflatable bag 76''' and is adapted to introduce whole blood, for example, into the disc bag 76''' through the centrally located tube 394. Since this centrifugation operation is continuous, the filtrates are thrown upwardly and outwardly through the central neck opening 390 into the trap or well 396 out through the discharge tube 398. The precipitates are continuously collected in the annular well as the process continues. When the continuous flow process ceases and the head is still rotating, the precipitates may be volumetrically adjusted and sealed off, heretofore described, to prevent their remixing with the filtrates remaining in the center well as the head ceases its rotation.

Figure 15:
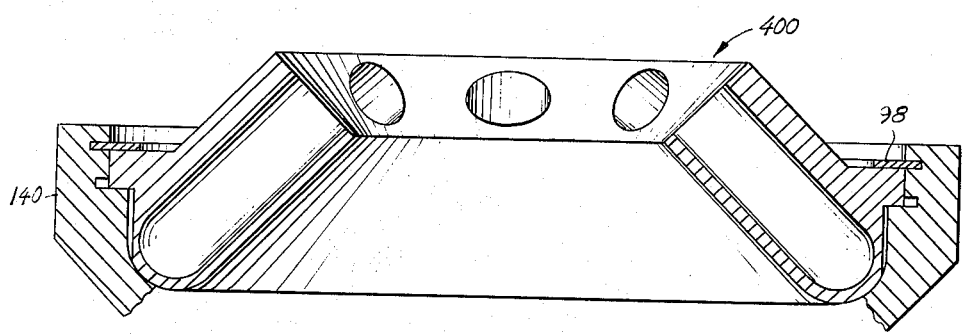
FIGURE 15 is a fragmentary sectional view showing a test tube adaptor installed in the head of the centrifuge of the present invention.

The present invention further contemplates a test tube adaptor 400 illustrated in FIG. 15 which is adapted to be inserted in the centrifuge of this invention pursuant to the manner in which a bag 76 is mounted. In this connection, the test tube adaptor 400 is secured in the centrifuge head through the operation of the snap ring 98, with the cap 96 eliminated as being unnecessary for this particular embodiment. The adaptor 400 is advantageously provided with a number of test tube receiving wells 402 which are adapted to receive test tubes containing the specimens of liquid to be fractionated.

*Optical system*

An optical system 350 is conveniently mounted on the hinged top closure 32 of the centrifuge casing for enabling the centrifuge attendant to view the centrifuging operation. This is preferred in order to adjust the volumetric capacity of the outer well of the bag 76, as well as determine the proper time at which to isolate the bag's central chamber from the outer well. During the actual centrifuging operation, the line of demarcation between the various ingredients of the liquid material to be separated is readily discernible. In this regard, the line of demarcation between plasma, buffy-coat and the red cells is relatively clearly defined. With this in mind, the optical system includes a bracket mount 352 secured to the closure 32 in a suitable manner. This mount supports a reflecting mirror 354 which is viewable through the aperture 356. The closure 32 is provided with opening 358 which will enable the reflected optical axis to be directed to juncture 308 between the bag's central chamber and peripheral well. In this connection, the permissible reflection will enable the attendant to also observe, if desired, the separation taking place in the outer well.

In order for the sealing zone 308 to be observed, the cap 96 is provided with a series of circumferentially extending slots 360 substantially aligned with this juncture. In passing, another series of slots 362 may also be formed in the closure 96 to enable the central chamber and its contents to be viewed. Under such circumstances, the reflection afforded by the mirrors 354 and 354' should enable one to sight through this series of slots. When slots 360 and 362 are provided in the retaining cap 96, provisions should be made for reinforcing the bag 76 along these unsupported areas. Accordingly, a shield 97, preferably formed from a somewhat rigid transparent material conforming to the inner contour of the closure 96 is interposed between the closure 96 and the bag 76.

Operation

In using a centrifuge incorporating the teachings of the present invention, the bag 76 is mounted in the head 78 resting on the upper surfaces of the plunger 80 and the boot 102. The shield 97 together with cap 96 are then placed over the bag and retained in place by means of the ring 98. In the event that the bag 76 includes plugs 310 or similar means, the bag 76 is oriented such that these parts do project through openings 320 of the cap 96 and associated openings of the shield 97. Similarly, the central plug 306 will project through the boss 346 of the closure 96; and in the event that the bag 76" is employed, the satellite receptacle 332 together with accompanying tube 320 is folded and secured within the cap 340 threadedly mounted on the boss 346. The appropriate plug 318 may then be anchored in place in the openings 320 of the closure 96. The liquid material to be separated which for purposes of the illustrative embodiment is taken to be blood, is volumetrically measured and placed in the bag 76 at any of the preceding stages.

The hinged closure 32 is then lowered over the centrifuge head 22 and the handle 68 turned to secure the closure 32 to its base 30. When the closure is firmly locked in place, the safety switch 72 will be actuated to its closed position so that the motor assembly 24 may properly be energized. When this switch is closed, light 73 conveniently mounted on the plate 66 will be automatically turned on as an indication of this condition together with the interior illuminating assembly 74. A power switch 368 is now turned on to connect the centrifuge motor assembly 24 to the energy source. An indicator light 370 on the control panel may be utilized to show that this switch is open or closed. A variable rheostat 372 is utilized to initiate the rotation of the centrifuge head assembly 22 by the motor assembly 24 and also serves to adjust the speed of rotation which is indicated on tachometer 374. The scale appearing on the dial of the rheostat 372 serves to indicate the percentage of the power transmitted to the motor in relationship to the capacity of the rheostat at line voltage. Transformers of this nature serve for application with the present invention are available commercially. With respect to speed regulator 372, means are provided whereby the power switch 368 in the form of a circuit breaker will automatically reopen if the rheostat 372 is at a position at which more than the desired amount of power is available through the particular rheostat setting at the initiation of operation of the motor assembly 24. The speed of he centrifuge head 22 is increased to approximately eight thousand r.p.m. When this constant running speed is attained, complete separation through centrifugation will occur in approximately 60 to 70 seconds. Quite obviously, depending upon the centrifugal forces generated or created, such times may be decreased.

The line of demarcation between the blood plasma, buffy-coat and red cells is viewed through the optical system 350. The flexible shaft 264 is now turned through movement of the dial 380 on the control panel to rotate the cam 262 before the boot is inflated and, consequently, effect optimum rotor sealing conditions by sliding the annular O-rings 200 and 230 over extension 184 and reed 186. Assuming that relatively pure plasma is desired, the boot 102 is inflated to shift the line of demarcation between plasma and buffy-coat radially inwardly. At any point prior to this, the compressor 274 is turned on through switch 376 on the control panel which actuation may be indicated by means of a lamp 378. Thus, the boot 102 is inflated pneumatically, as explained above, such that the sealing zones 308 at the junction between the main central chamber and outer annular well is aligned with the line of demarcation between plasma and buffy-coat as viewed through the viewing means 350. A lamp 382 may also be located on the control panel to indicate that this switch 380 is in an ON position.

The plunger 80 is now shifted upwardly to seal the zone 308. As stated in the foregoing, the pneumatic line pressure from compressor 274 is placed on the inner face of the base of the piston 82 and is then supplemented by means of the hand pump 278 to the desired amount as indicated by the gauge 288. The motor assembly 24 is now deenergized to stop the rotation of the head assembly 22. In this connection, a suitable breaking device may be employed separately or as part of the motor to provide immediate access to the separated blood constituents. Otherwise it has been found that for a complete operation based on the foregoing cycle of steps, a time interval less than about 6 to 7 minutes will be involved. The separated constituents of the blood in the bag 76 are then utilized as desired.

The bag 76 may now be removed for preparation of the centrifuge for another centrifuging operation. Thus, the closure 32 is unlocked and opened to its resting position on the rest 60. The retaining ring 98 is then released to permit the removal of the cap 96 and shield 97. The expended bag 76 may now be replaced with a new bag for receiving a fresh sample of blood.

It should be readily apparent to those skilled in the art that relatively accurate and rapid separation of samples of liquid materials and solutions is most effectively attained by the present invention. Constituents of such materials are collected within a minimum amount of time. High speed centrifugation is employed with mass and radial dimensions held at a minimum. Selective sealing off and isolation of one fraction from another during the centrifugation cycle is provided; and in accordance with the present teachings, this separation is maintained after the centrifugation process has been completed. The centrifuge attendant or operator is furnished with an effective built-in system that enables him to observe phase separation as it occurs during centrifugation so that accurate fractionating and isolation is obtained. Needless to say, the percentage of plasma recoverable for unit of whole blood is significant and comparatively high. Obviously, the disadvantages inherent in prior art batch separation techniques have been most effectively obviated by the teachings of the present invention.

Thus, among others, the several aforementioned objects and advantages among others are achieved. Although preferred embodiments of the invention have been disclosed and described in detail herein, it should be understood that the present invention is in no sense limited thereby and its scope is to be determined by that of the appended claims.

I claim:

1. A disposable bag of generally circular configuration for use in centrifugation apparatus and for containing fluid materials the constituents of which are to be separated by said apparatus, said bag comprising an upper wall and a lower wall, said walls being spaced from one another and defining a generally conical central main chamber and a peripheral concentrically disposed annular well communicating therewith, said walls having annular sealing zones at the juncture between said chamber and said well in confronting relationship with one another, with at least one of said walls being flexible so that the sealing zones are adapted to be brought into sealing engagement with one another to create a sealed annulus to trap constituents of the liquid materials of lower specific gravity in said chamber and separate them from the constituents of higher specific gravity in said well upon centrifugation, and said upper wall being provided with a central opening through which materials to be separated can be introduced and withdrawn, access means being on said bag at said peripheral well for providing access to the well, said access means being in the form of a pair of diametrically opposed projections extending from the upper wall of said bag, each of said projections including a passageway communicating with said well and a closure means for said passageway, and a length of tubing being coupled with said upper wall with one end of said tubing being concentrically disposed with respect to the central opening therein, a receptacle coupled with the other end of said tube such that the interior of the receptacle is in communication with the passageway defined by said tube, and means on said receptacle for providing a supplemental access means to the interior of said receptacle.

2. The invention in accordance with claim 1 wherein said supplemental access means is in the form of at least one projection having a passageway therethrough communicating with the interior of said receptacle and a closure means for the passageway.

3. A disposable bag of generally circular configuration for use in centrifugation apparatus and for containing fluid materials the constituents of which are to be separated by said apparatus, said bag comprising an upper wall and a lower wall, said walls being spaced from one another and defining a generally conical central main chamber and a peripheral concentrically disposed annular well communicating therewith, said walls having annular sealing zones at the juncture between said chamber and said well in confronting relationship with one another, with at least one of said walls being flexible so that the sealing zones are adapted to be brought into sealing engagement with one another to create a sealed annulus to trap constituents of the liquid materials of lower specific gravity in said chamber and separate them from the constituents of higher specific gravity in said well upon centrifugation, and said upper wall being provided with a central opening through which materials to be separated can be introduced and withdrawn, a length of tubing being coupled with said upper wall with one end of said tubing being concentrically disposed with respect to the central opening herein, a receptacle coupled with the other end of said tube such that the interior of the receptacle is in communication with the passageway defined by said tube, and means on said receptable for providing a supplemental access means to the interior of said receptable.

4. The invention in accordance with claim 3 wherein said supplemental access means is in the form of at least one projection having a passageway therethrough communicating with the interior of said receptable and a closure means for the passageway.

5. Apparatus for use in separating materials into components of relatively higher and relatively lower specific gravity comprising a drive shaft and a motor for causing the rotation thereof, a rotor head operatively connected to the drive shaft to be rotated thereby and formed with a circular recess concentric with the center of rotation, a separate removable liner for the recess in the rotor head in the form of a hollow circular body having upper and lower walls of sheet material spaced from each other to provide a central chamber and being associated with one another around their peripheries to define an annular chamber closed around the outer edge and communicating with the central chamber at its inner edge, said walls having annular confronting sealing zones between the two chambers, said head having clamping means spaced inwardly from the periphery of the recess in registry with the sealing zones of the liner to clamp said sealing zones into sealing engagement with each other, means for adjusting the capacity of said annular chamber to determine the quantity of materials to be sealed off eventually in both chambers, the adjusting means including annular flexible boot means on the head for compressing the wall of said liner around the annular chamber while the rotor head is rotating to express some of the materials from the annular chamber into the central chamber, means for determining the amount of adjustment introduced by the adjusting means, and means for operating said clamping means while said rotor head is rotating to cause said sealing zones to have sealing engagement and thereby sealing off materials of relatively higher specific gravity in the annular chamber from materials of relatively lower specific gravity in the central chamber.

6. Apparatus for use in separating materials into components of relatively higher and relatively lower specific gravity comprising a drive shaft and a motor for causing the rotation thereof, a rotor head operatively connected to the drive shaft to be rotated thereby and formed with a circular recess concentric with the center of rotation, a separate removable liner for the recess in the rotor head in the form of a hollow circular body having upper and lower walls of sheet material spaced from each other to provide a central chamber and being associated with one another around their peripheries to define an annular chamber closed around the outer edge and communicating with the central chamber at its inner edge, said walls having annular confronting sealing zones between the two chambers, said head having clamping means spaced inwardly from the periphery of the recess in registry with the sealing zones of the liner to clamp said sealing zones into sealing engagement with each other, hydraulic means for adjusting the capacity of said annular chamber to determine the quantity of materials to be sealed off eventually in both chambers, means for determining the amount of adjustment introduced by the adjusting means, and hydraulic means for operating said clamping means while said rotor head is rotating to cause said sealing zones to have sealing engagment and thereby sealing off materials of relatively higher specific gravity in the annular chamber from materials of relatively lower specific gravity in the central chamber.

References Cited by the Examiner

UNITED STATES PATENTS

| | | | |
|---|---|---|---|
| 987,613 | 3/1911 | Campau | 233—26 |
| 2,578,484 | 12/1951 | Nyrop | 233—20 |
| 2,661,150 | 12/1953 | Abbott | 233—27 |
| 2,702,034 | 2/1955 | Walter. | |
| 3,009,388 | 11/1961 | Polanyi. | |
| 3,022,937 | 2/1962 | Dega | 233—28 |
| 3,064,647 | 11/1962 | Earl. | |
| 3,129,175 | 4/1964 | Jones et al. | 233—28 |
| 3,145,173 | 8/1964 | Sharples. | |
| 3,168,473 | 2/1965 | Goda et al. | 233—26 |

FOREIGN PATENTS 1,260,968  4/1961  France.

M. CARY NELSON, *Primary Examiner.*

H. KLINKSIEK, *Assistant Examiner.*